United States Patent
Chapman et al.

(10) Patent No.: US 11,074,122 B2
(45) Date of Patent: Jul. 27, 2021

(54) GRACEFUL DEGRADATION OF USER INTERFACE COMPONENTS IN RESPONSE TO ERRORS

(71) Applicant: International Business Machines Corporation, Armonk, NY (US)

(72) Inventors: Matthew Paul Chapman, Eastleigh (GB); Chengxuan Xing, Romsey (GB); Ashley Donald Harrison, Southampton (GB); Andrew James Daniel, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 16/535,733

(22) Filed: Aug. 8, 2019

(65) Prior Publication Data

US 2021/0042182 A1    Feb. 11, 2021

(51) Int. Cl.
  *G06F 11/07* (2006.01)
  *G06F 3/0481* (2013.01)
(52) U.S. Cl.
  CPC ........ *G06F 11/0793* (2013.01); *G06F 3/0481* (2013.01); *G06F 11/076* (2013.01); *G06F 11/0751* (2013.01); *G06F 11/0757* (2013.01); *G06F 11/0769* (2013.01)
(58) Field of Classification Search
  CPC .... G06F 11/0754; G06F 11/757; G06F 11/76; G06F 11/0769; G06F 11/0793; G06F 11/142; G06F 11/143; G06F 11/302; G06F 11/3438; G06F 3/0481; G06F 3/04812; G06F 3/04815; G06F 3/04817; G06F 3/0482; G06F 3/0483
  See application file for complete search history.

(56) References Cited

U.S. PATENT DOCUMENTS

| | | | |
|---|---|---|---|
| 7,325,045 B1 * | 1/2008 | Manber | G06F 11/0709 709/219 |
| 8,943,423 B2 | 1/2015 | Merrill et al. | |
| 9,037,914 B1 | 5/2015 | Au et al. | |
| 9,423,920 B2 | 8/2016 | Brunswig et al. | |
| 10,289,445 B1 * | 5/2019 | Swanson | G06F 11/3433 |

(Continued)

OTHER PUBLICATIONS

Github, "Implement Zones for JavaScript," https://github.com/angular/zone.js, printed Apr. 2119, 5 pgs.

(Continued)

*Primary Examiner* — Gabriel Chu
(74) *Attorney, Agent, or Firm* — Mark Bergner (57) ABSTRACT

A computer-implemented system and method detect an error in an application comprising a component having a control that is displayed in a first state on a display device. Responsive to the detecting of the error, the method comprises associating the error with the control, and, upon making this association, the method comprises automatically modifying the component at application run-time. This modification indicates that the control is no longer functional. A display operation of the component is performed where the modified component has: a) the control displayed in a second state on the component, or b) the control is removed from the component. The method may be repeated when other errors occur, and the control may be restored when the underlying error is resolved.

19 Claims, 6 Drawing Sheets

(56) References Cited

U.S. PATENT DOCUMENTS

| | | | |
|---|---|---|---|
| 2012/0166984 A1* | 6/2012 | Brunswig | G06F 16/252 |
| | | | 715/765 |
| 2014/0082500 A1* | 3/2014 | Wilensky | G06F 3/04845 |
| | | | 715/727 |
| 2016/0026356 A1 | 1/2016 | Persaud | |
| 2017/0228220 A1 | 8/2017 | Dai et al. | |
| 2017/0329465 A1* | 11/2017 | Hong | G06F 3/04883 |
| 2018/0011678 A1* | 1/2018 | Shipper | G06F 3/1454 |

OTHER PUBLICATIONS

React, "Error Boundaries," https://reactjs.org/docs/error-boundaries.html, printed Aug. 8, 2019, 5 pgs.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

GRACEFUL DEGRADATION OF USER INTERFACE COMPONENTS IN RESPONSE TO ERRORS

BACKGROUND

Disclosed herein is a system and related method for allowing a graceful degradation of components in response to errors. In various applications, such as web-based applications, or any errors in code, such as client-side code, may result in significant problems for the user. For example, the entire application could break leaving the user faced with a blank screen, or the application could fail to respond to user actions with no feedback. Preventing access to other functioning parts of the application in the event of an error impacting only a non-functioning part of the application may be inefficient for the application user.

SUMMARY

According various embodiments described herein, a computer-implemented method, is provided comprising detecting an error in an application comprising a component having a control that is displayed in a first state on a display device. Responsive to the detecting of the error, the method comprises associating the error with the control, and, in response to the association of the error with the control, the method comprises automatically modifying the component at application run-time. This modification indicates that the control is no longer functional. A display operation of the component is performed where the modified component has: a) the control displayed in a second state on the component, or b) the control is removed from the component.

According to various embodiments described herein, a system may be provided comprising a processor for implementing the above-described method operations. Furthermore, various embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or devices described herein.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

When errors occur in a system, it would be advantageous to allow operable elements in the system to remain operable while providing an indication of inoperable elements to the user by way of the user interface in order to indicate which element(s) is (are) associated with the cause of inoperability. When a user interaction with a control results in an error, the control may be disabled to prevent further interaction with the control until the problem can be solved. However, it may not always be obvious which control is responsible for creating the area, since there may be some delay introduced between the interaction with the control and the error-causing activity. In this instance, various techniques may be employed in order to better associate the control with the error cause by interaction with it.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
LTA logging/tracking/audit
OMP optimal maneuver profile
PaaS platform as a service
PDA personal digital assistant
PLA programmable logic arrays
RAM random access memory
RISC reduced instruction set computer
ROM read-only memory
SaaS software as a service
SLA service level agreement
SOI search optimization service
SRAM static random access memory
WAN wide-area network
Cloud Computing It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
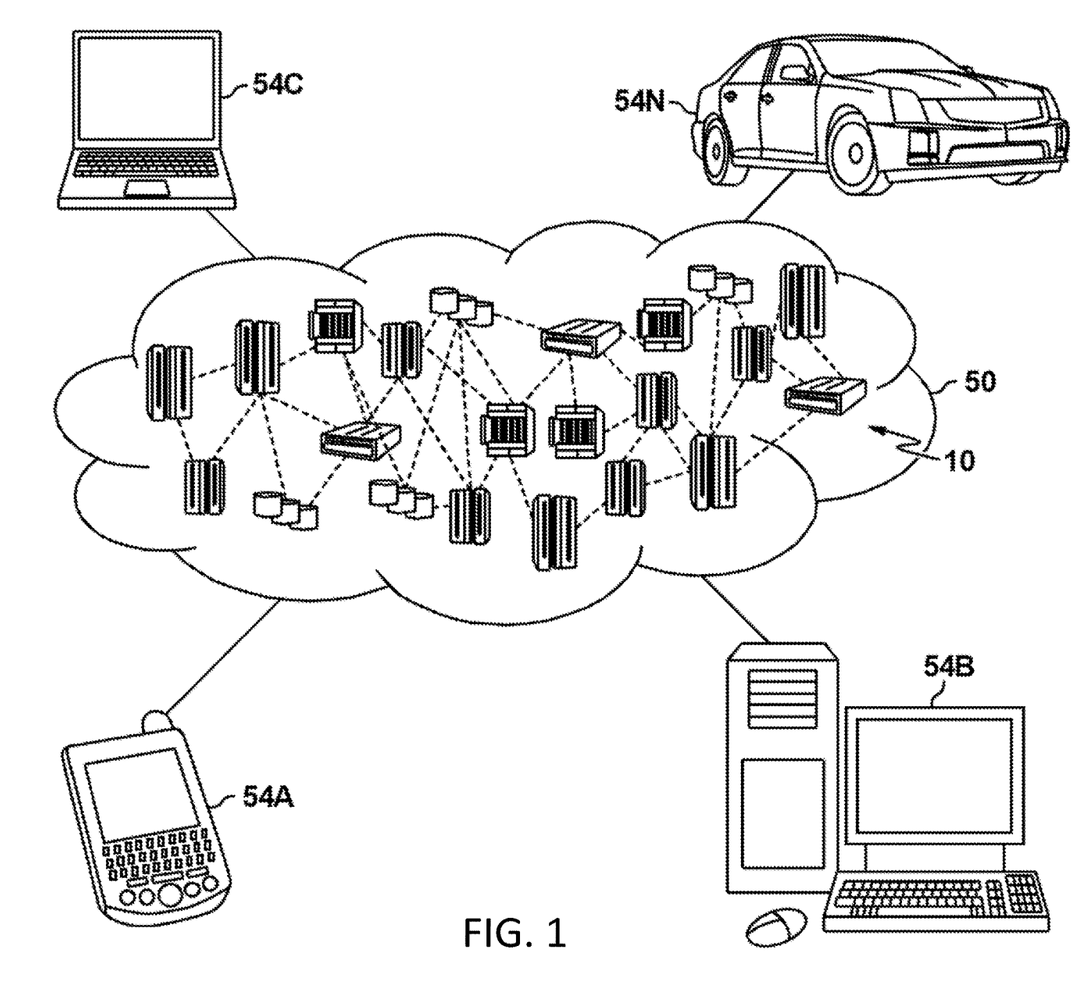
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
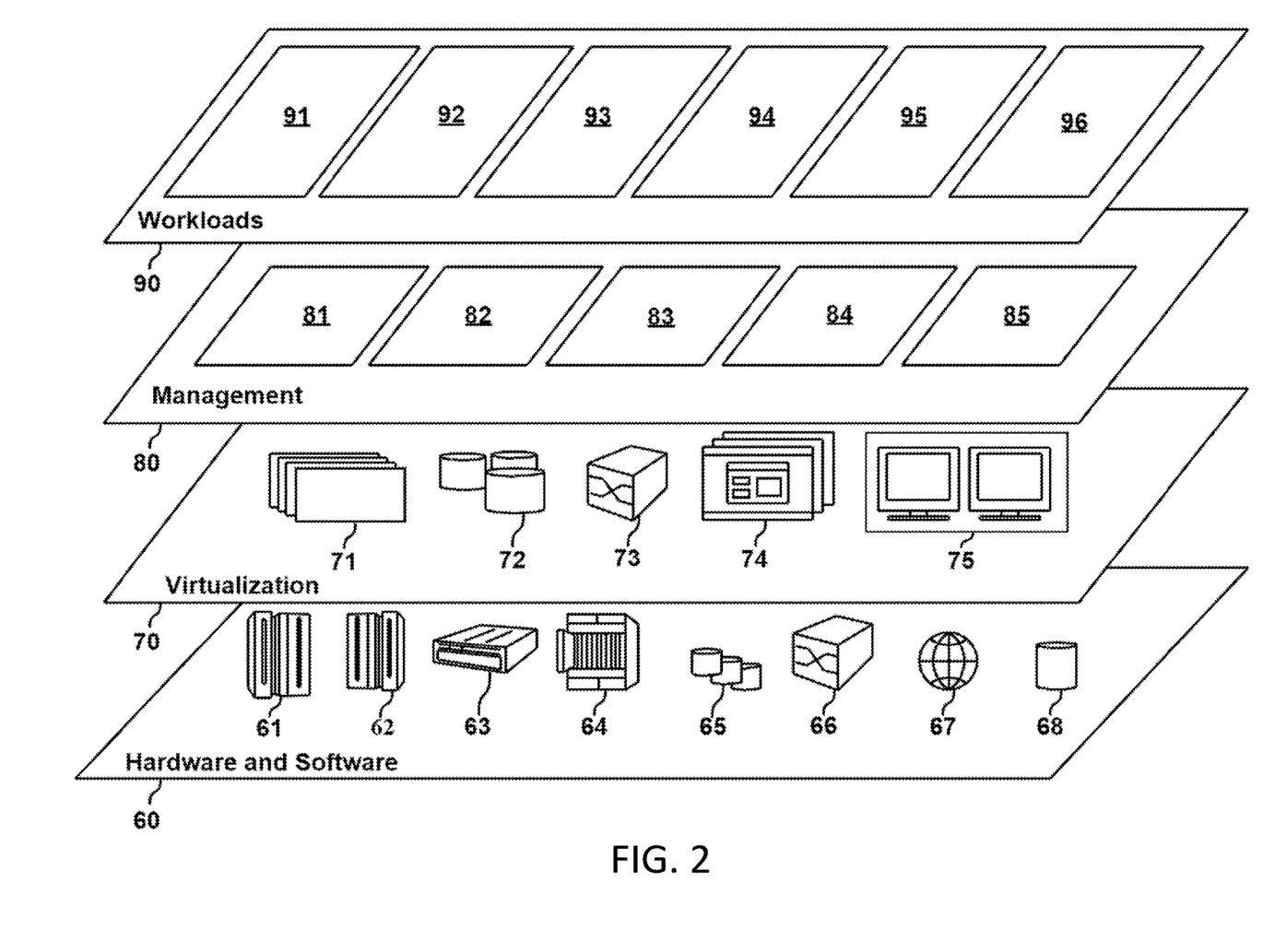
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System

Figure 3:
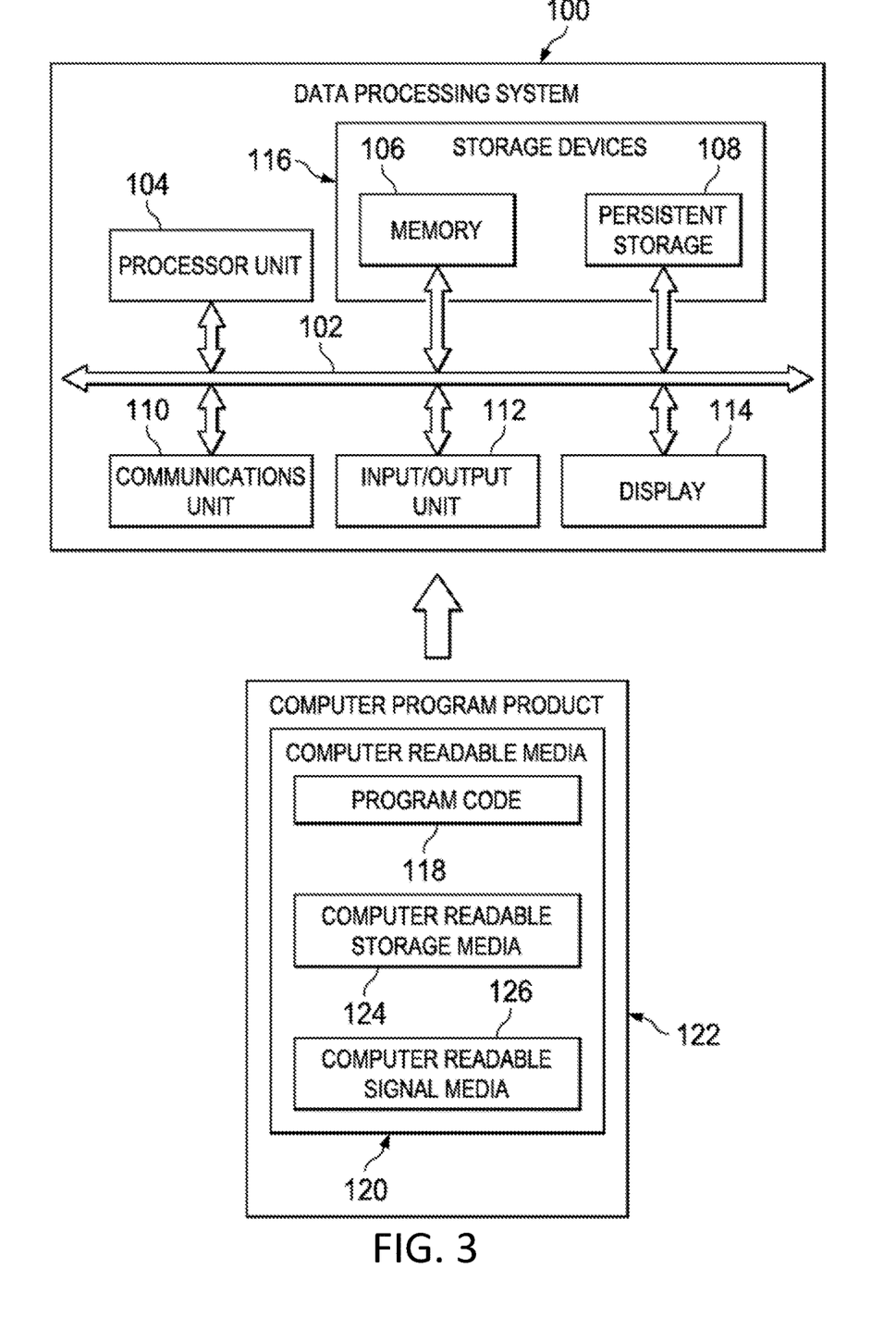
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Graceful Degradation of Components & Component Lifecycle

The ideas described herein may apply to a variety of development frameworks. Such frameworks may include those for vanilla JavaScript client-side applications, or specific frameworks such as React and the use of the React Error Boundary Feature. Existing error handling solutions may include basic "try/catch" blocks, such as those available in JavaScript, and the more sophisticated solutions like the "Error Boundaries" feature provided by the React framework (from version 16 onwards). React is a JavaScript library that is maintained by Facebook and a community of individual developers and companies and that may be used for building user interfaces. React Error Boundaries are used to contain client-side errors within a specific front-end component or tree of components such that the error does not affect the entire application. Web developers using this feature implement an error component to show in place of a component having an error.

Disclosed herein are embodiments that may be advantageous over these prior ways of handing errors—these embodiments may automatically generate error components or modifications to components in many situations so that the developer of the application does not have to explicitly create multiple different error components to handle each and every error situation that may be encountered. Each generated or modified error component may be similar to the original component, but with the element that caused the error or that is impacted by the error being removed or modified. Furthermore, in some embodiments, if the first error causes a second error and further errors in a cascading manner, in some implementations, the causing or affected component may be further modified as well as other impacted components. The second error may occur at a different time than the first error, or may occur simultaneously or at approximately the same time as the first error. In some embodiments, the second error may be independent of the first error. In these cases, the modification to the component with respect to the second error may be done in the same manner as described herein with respect to the first error. In some embodiments, when the underlying condition(s) related to the error(s) is (are) restored, then the control that was modified or removed may be restored to its original state as well.

Figure 4:
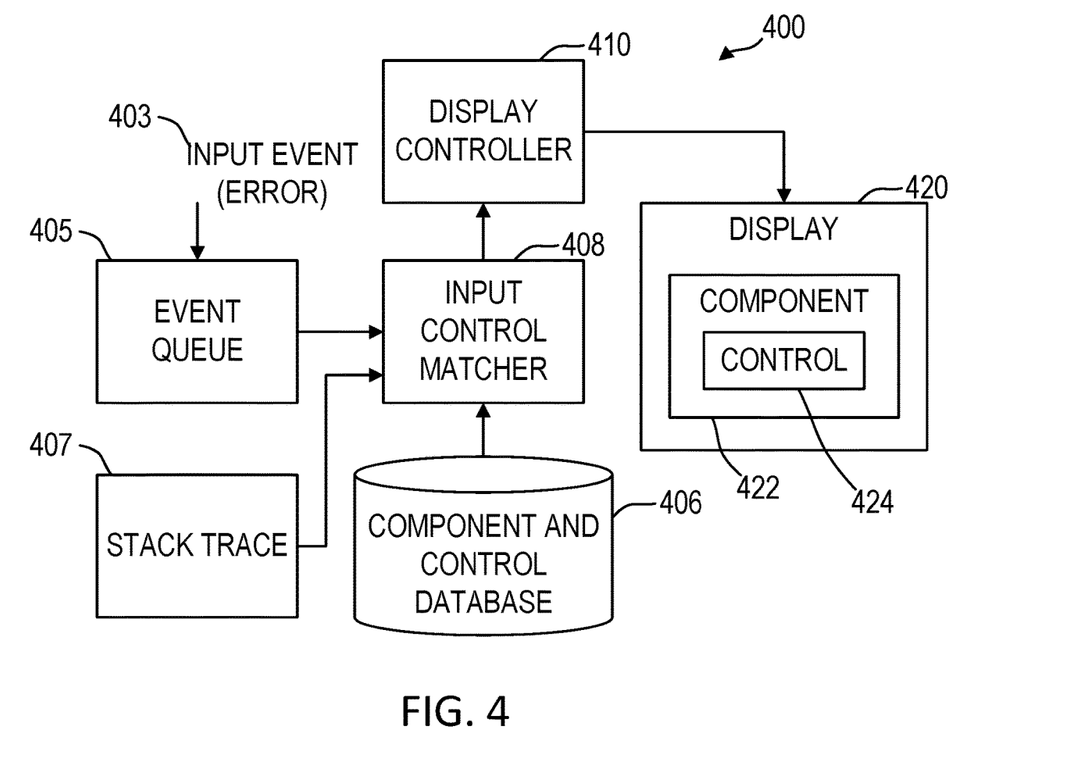
FIG. 4 is a block diagram illustrating some embodiments of a system described herein.

FIG. 4 is a block diagram showing components that illustrate some embodiments disclosed herein. A computer system 400, such as DPS 100, may allow a user to experience a gradual degradation in functionality of an application, rather than an "all or nothing" mode of operation, without the developer needing to implement a large number of replacement interface components. The application may be implemented in a client-server architecture that may make use of the cloud-based architecture described above. For example, the application may be executed on cloud computing nodes 10 in the cloud computing environment 50 using devices 54A-N as illustrated in FIG. 1.

When an error occurs in an application, such as when a client-side error is caught in a web application, an error input event 403 may be generated and logged to, e.g., an event queue 405. The system may determine whether that error can be associated with an input control 424 in a component 422 or tree of components on a display 420 associated with the application within which the error has been caught. A component may also be a widget or other component of an interface that enables a user to perform a function or access a service. In one example, the component 422 may be a tile on a dashboard that forms part of the display 500. Many errors are triggered by the user performing an action within the web application, for example, clicking a button or selecting a menu item. The system may attempt to link the error with the specific input control 424. It may do this by first, using an input control matcher 408, checking if there is a stack trace 407 associated with the error, and if the specific input control 424 and/or the component 422 to which it belongs is mentioned at the top of the stack 407. Otherwise, the input control matcher 408 may look at the most recent input event 403 that occurred and determine whether it occurred shortly before the error was caught. If so, the input control matcher 408 may then find the input control 424 associated with that event. If such a linked input control 424 is found, then the system may automatically generate a replacement to the failed component 422 by creating a duplicate component 422 but without the control 424 that triggered the error. If no such control is found, then a developer-provided error component 422 may be used as a fallback.

Figure 5A:
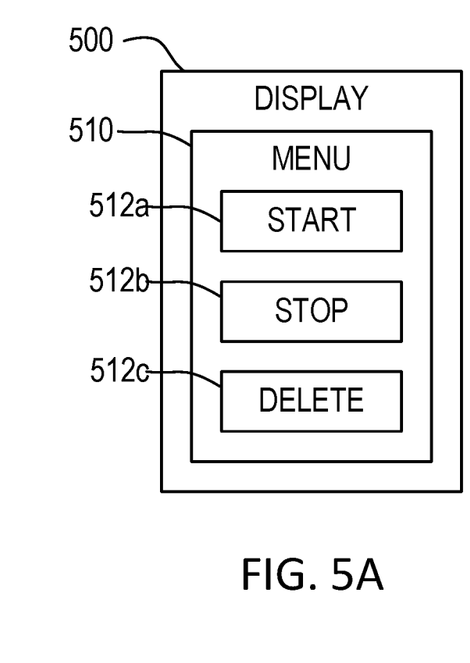
FIG. 5A is screen shot diagram illustrating some embodiments of a component with all controls functional on a display.

FIG. 5A is an example screen shot illustration, according to some embodiments, of a display 500 having on it a component 422 in the form of a menu 510 on a dashboard tile. The menu 510 comprises user-selectable options in the form of input controls that include: a start menu item 512a, a stop menu item 512b, and a delete menu item 512c (the reference numeral 512 may refer to these menu items collectively or representatively). Although presented here as menu items, the controls 512 may take on the form of any type of user interface element, such as buttons, radio buttons, checkboxes, list items, drop-down lists, menu items, entry fields, etc. In this use case, the menu 510 and its elements (menu items) related to starting 512a, stopping 512b, and deleting 512c relate to handling queries into a database, although they could easily relate to controlling any other application or function.

Figure 5B:
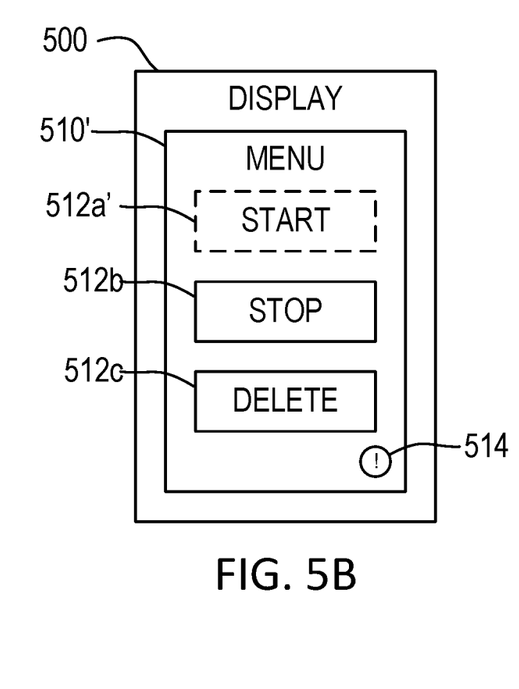
FIG. 5B is screen shot diagram illustrating some embodiments of a component with a control non-functional on a display.

FIG. 5B is an example screen shot illustration, according to some embodiments, of the display 500 of FIG. 5A in which a response to an error has occurred. The error in this use case occurs due to an inability of a storage space to handle any additional queries and store the results. Although additional queries may no longer be started until storage space clears up, currently executing queries may be stopped or deleted. Therefore, it is inefficient to simply indicate a general purpose "out-of-space" error message and disable all interaction with the application, while at the same time it is also inefficient to leave the start menu item 512a active to allow the user to attempt to start an additional query when it is known by the system that the result will be an out-of-space error.

As shown in FIG. 5B, a new (or altered) menu 510' element is displayed that alters the start menu item 512a' from a first (active) state (as shown by the start element 512a in FIG. 5A) to a second (inactive) state as shown by the start menu item 512a' that prevents the user from interacting with the start menu item 512a' to start another query. The second state may alter the appearance of the start menu item 512a' in a number of ways. In some embodiments, the start menu item 512a' is removed from the menu 510' entirely, such that the menu 510' only displays the stop 512b and the delete 512c menu items. In other embodiments, the start menu item 512a' may be grayed or dimmed, it may have its color changed (e.g., from green to red), or, it may have its border altered (e.g., use of a dashed line instead of a solid line), its size reduced, or be altered in any sort of way to indicate that the user not able to interact with this user element.

In some embodiments, the new menu 510' or component may display an indicator 514 indicating that the menu 510' or component is in a modified state from that of normal operation. A user who selects the indicator 514 or hovers over it (e.g., with a mouse pointer) may be able to obtain some additional information as to why the component 510' is in an altered state. The additional information may be very basic, e.g., simply noting the altered control ("The start operation has been disabled"), very detailed, e.g., providing extensive information about the error and its resolution ("the query storage queue on server xyz is full and cannot accept new queries—estimated availability time is 12:45p EDT"), or something in between. By modifying only the control 512 associated with the error, remaining functionalities associated with the component may still be interacted with. By dynamically modifying the relevant controls 512 in this manner, the application developer need not develop a separate replacement component 510' for each and every combination of errors that might occur related to the component 510'.

The process described above may take place for any number of components 510 and their respective controls 512. For example, in the use case described above, if there is a general problem with access to the file system that is associated with the delete menu item 512c, in addition to the modified start menu item 512a', the component 510 could also be modified in the same way with regard to the delete menu item 512c.

Additionally, the reverse may be true. Once an error has been resolved, a related control 512 that has been modified to prevent execution of the function associated with that control may be restored. By way of example, if space on the previously full query storage queue frees up, the modified start menu item 512a' may be restored back to its original form (start menu item 512a) and become operational again.

Figure 6:
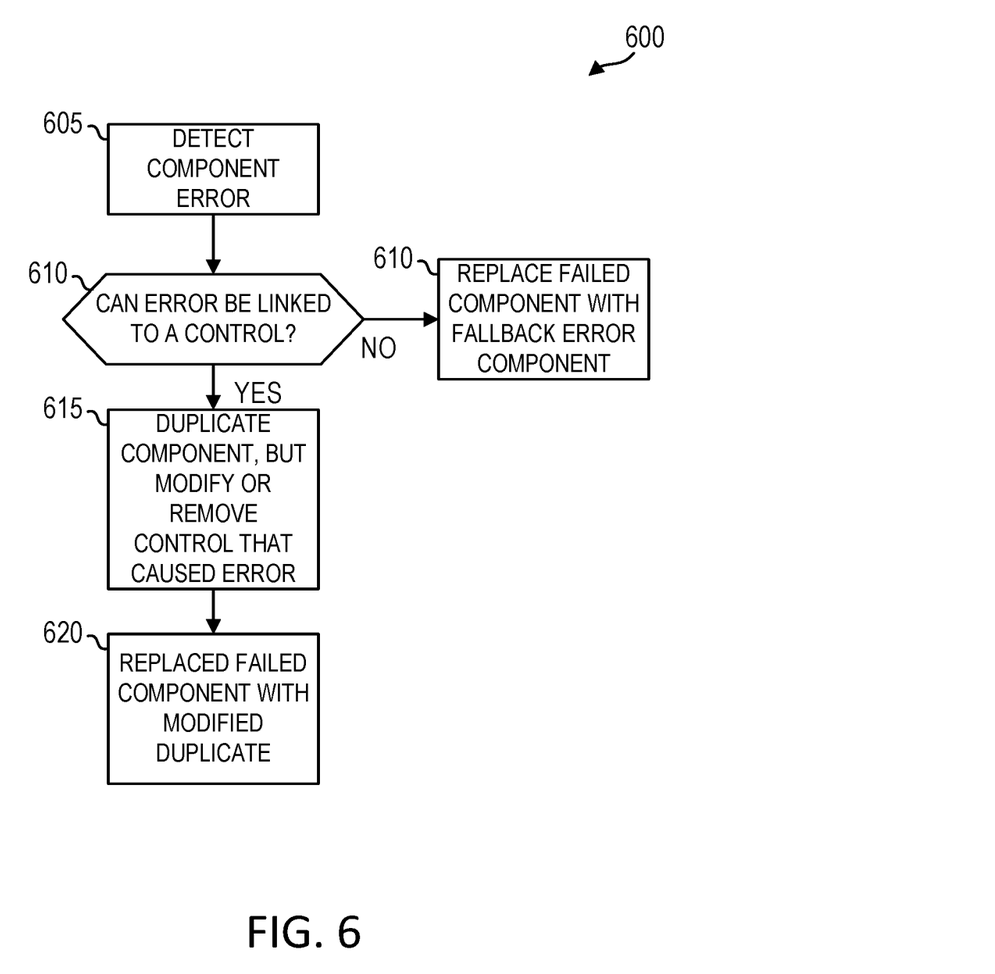
FIG. 6 is a flowchart illustrating some embodiments of a process disclosed herein.

FIG. 6 is a flowchart that illustrates a process 600 for modifying the component 422. In some implementations, the process 600 is executed on a processor running a client-side JavaScript process, but the invention is not limited to execution on such a platform. In operation 605, a component error is detected. In operation 610, a determination is made as to whether the error can be linked to a particular control 424. If not (610: NO), then the component 422 or its respective control 424 may be replaced with a fallback error component that indicates that an error has occurred, such as an error message text block or the like, and/or the original component 422, 510 is displayed or continues to be displayed. If the error can be linked to a control (610: YES), then, in operation 615, the component 422, 510 may be duplicated, but the control 424 that is linked to the error may be modified or removed from the component 422, 510', and in operation 620, the original component 510 may be replaced with the modified component 510' on the display 420, 500.

Associating a Client-Side Determined Error with a Specific User Interface Control A client-side determined error may mean an error in which some aspect related to the user interface breaks, irrespective of what caused the breakage. As described above, determining whether an error can be linked to a control and to which control (operation 610) may, in some cases, be straightforward. For example, executing a control 424, such as clicking a button, to attempt to save a file to a non-existent directory or device would immediately causes an error. In this case, the stack trace 404 for the error may and immediately directly list the control 424, such as the save button, so that the association/linkage between the control 424 and the error may be made easily by retrieving the control element nearest the top (most recent part) of the stack trace 404. If some short-term criteria is met, such as the error occurring within some predetermined time of interacting with the control 424, or some predetermined number of events or elements in the stack trace 404, then such a linkage may be determined. In other cases, the error may occur asynchronously to operation of the control 424, and thus the linkage between the control 424 and the error may be more difficult. For example, using JavaScript's "setTimeout" function to delay execution of a routine may result in an error that occurs substantially after operation of the control 424. In this situation, existing techniques such as "Zones" (e.g., as implemented by JavaScript's zone.js) may be used—zones simply provide execution contexts similar to threads in other languages. Zones can perform an operation (e.g., starting a timer, stopping a timer, saving a stack trace, etc.), each time that code enters or exits a zone. Thus, the stack trace 407 from a particular zone may contain the information about a relevant control 424 associated with the error. Zones may be used to override methods within code or associate data with individual zones. By utilizing zones in this way, asynchronous actions may be correlated with the proper source control that initiated the action.

Other cases may be more complex. Representational state transfer (REST) is a software architecture style for exposing resources in which: HTTP methods are used exclusively, a call is stateless, it exposes directory structure-like URIs (uniform resource identifiers), and transfers XML (extensible markup language), JavaScript Object Notation (JSON), or both. A more complex case might then involve clicking a button that triggers a REST call to a server to be made. Processing the response may cause a client-side error to be thrown.

In this case, the button as the control 424 might not be listed in the stack trace 404 for the error, and the "Zones" described above cannot be used because the requests are going to the backend, outside of the client-side JavaScript process. In order to address this situation, a buffer of recent input events may be maintained so that when an error is caught, the process looks at the most recent input event. However, such an approach could result in a false positive. For example, if the user clicks button one followed quickly by button two, but it is button one that caused the REST call that then resulted in the client-side error, the proper association may be difficult.

This situation in which the associated user interface control cannot be determined accurately may be addressed, in some embodiments, by using a threshold failure count. Initially, the process only records the error and the most recent input event, but does not immediately remove that control. Instead the process may wait until the same user interface control 424 has been associated with a particular error (or group of errors) a predetermined number of times, a predetermined percentage of the time, or a greatest percentage of the time before automatically modifying the component 422. If a user performs an action and it fails, the user is quite likely to re-attempt that action. Thus, on the first failure, the process may replace the failed component 422 with another unmodified instance (e.g., in a React embodiment in which, for a caught error, the component is unmounted—in other embodiments, the component may simply be left alone), but on the second (or $n^{th}$) failure, the same input control 424 may be implicated (with, e.g., a predetermined amount of certainty). This approach may thus provide greater confidence in the association between the control and the error being correct.

By way of example, an error is detected, but there is a predefined delay between the detected error an interaction with a control 424 in the stack trace 404. An inspection of the stack trace 404 reveals that three possible controls 424 may be associated with the error. In this circumstance, there may be uncertainty as to which control 424 is most responsible for the error, and thus, the component 422 is not changed at this time. In subsequent instances of this error being detected, only one of the controls 424 is consistently found in the stack trace 404. Based on this consistent association of a particular control 424 with the error, the control 424 is modified on the component 422.

Although the above describes replacing a failed component 422, 510 or control 424, 512a with a modified version 422, 510', 512a', the error that caused the failure may be transient in nature. For example, the REST call may have returned an expected response because a backend server was down, but once service is restored, the client-side error may not happen anymore. Therefore, it may be appropriate for the system to return to the original component 422, 510 or control 424 at some point, instead of using the replacement indefinitely. At a minimum, the system may return to the original component 422, 510 when the user starts a new session, and also if the user explicitly reloaded the application in their browser. The process may choose to return to the original component 422, 510 at other times as well, such as when navigating between sections of the application. If the same error happened again, the process would then not return to the original component 422, 510 if the user performs the same navigation.

The above describes, in various embodiments, procedures used for modifying a control element of a component best ascertained as a cause of the error, but the same mechanism may be utilized in order to modify control elements that may be impacted by an error. By way of example, a problem may exist that prevents a user from saving a file (e.g., disk full). In the previous embodiments, the disk full was caused by the user saving a file by pressing a "save file" control element and creating a disk full error. However, the disk full condition may result from other causes. In this situation, the "save file" control element may still be modified, even though an interaction with it was not the cause. Certain of the techniques described above may be employed in order to determine likely controls and components that may be impacted by an error condition so that the controls may be modified while the error condition exists, and then possibly be restored when the error condition is no longer present.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
    detecting an error in an application comprising a component having a control that is displayed in a first state on a display device;
    responsive to the detecting of the error, associating the error with the control;
    in response to the association of the error with the control, automatically modifying the component at application run-time to indicate that the control is no longer functional, in a display operation selected from the group consisting of: a) the control is displayed in a second state on the component and b) the control is removed from the component; and
    outputting the component on the display device.

2. The method of claim 1, wherein:
    the application is a web-based application; and
    the error is a client-side detectable error.

3. The method of claim 2, wherein the client-side detectable error is a in a JavaScript process.

4. The method of claim 3, wherein the associating the error with the control is based on a stack trace of a zone associated with the error.

5. The method of claim 1, wherein the component comprises a plurality of controls.

6. The method of claim 1, further comprising:
    detecting that the error in the application has been resolved;
    automatically modifying the component to restore the component such that the control is displayed in the first state on the display device.

7. The method of claim 1, wherein the associating the error with the control is based on a short-term criteria selected from the group consisting of: a) the error occurring within a predetermined time of an interaction with the control, and b) the control being within a predetermined number of events or elements from a top of a stack trace.

8. The method of claim 7, wherein the associating the error with the control comprises retrieving a control element nearest a top of a stack trace.

9. The method of claim 1, wherein the second state is selected from the group consisting of a changed color, dimmed, grayed, and dashed lines.

10. The method of claim 1, wherein the component comprises an indicator that indicates the component is in a modified state from that of a normal operation.

11. The method of claim 1, further comprising:
    detecting a second error in an application wherein the component has a second control that is displayed in a second control first state on a display device;
    responsive to the detecting of the second error, associating the second error with the second control;
    in response to the association of the second error with the second control, automatically modifying the component at application run-time to indicate that the second control is no longer functional, in a display operation selected from the group consisting of: a) the second control is displayed in a second control second state on the component and b) the second control is removed from the component; and
    outputting the component on the display device.

12. The method of claim 1, wherein the component is selected from the group consisting of a tile and a widget on a dashboard.

13. The method of claim 1, further comprising:
    determining that there is no association between the error and the control;
    responsive to the determination of no association, replacing the component with a separate developer-provided error component.

14. The method of claim 1, wherein the control is selected from the group consisting of a button, a radio button, a menu item, a list item, a checkbox, and an entry field.

15. The method of claim 1, wherein the automatically modifying is responsive only by associating the error with the control a predetermined number of times.

16. An error handling system for displaying components and controls, the system comprising:
    a processor configured to:
    detect an error in an application comprising a component having a control that is displayed in a first state on a display device;
    responsive to the detection of the error, associate the error with the control;
    in response to the association of the error with the control, automatically modify the component at application run-time to indicate that the control is no longer functional, in a display operation selected from the group consisting of: a) the control is displayed in a second state on the component and b) the control is removed from the component; and outputting the component on the display device.

17. The system of claim 16, wherein the association of the error with the control is based on a short-term criteria selected from the group consisting of: a) the error occurring within a predetermined time of an interaction with the control, and b) the control being within a predetermined number of events or elements from a top of a stack trace.

18. The system of claim 16, wherein the second state is selected from the group consisting of a changed color, dimmed, grayed, and dashed lines.

19. The system of claim 16, wherein the control is selected from the group consisting of a button, a radio button, a menu item, a list item, a checkbox, and an entry field.

* * * * *